(12) United States Patent
Popli et al.

(10) Patent No.: US 10,197,319 B2
(45) Date of Patent: Feb. 5, 2019

(54) SYSTEM AND METHOD OF CONTROLLING A VARIABLE-CAPACITY COMPRESSOR

(71) Applicant: Emerson Climate Technologies, Inc., Sidney, OH (US)

(72) Inventors: Sahil Popli, Troy, OH (US); Edward J. Trudeau, Jr., Covington, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 291 days.

(21) Appl. No.: 15/138,981

(22) Filed: Apr. 26, 2016

(65) Prior Publication Data

US 2016/0313042 A1 Oct. 27, 2016

Related U.S. Application Data

(60) Provisional application No. 62/309,247, filed on Mar. 16, 2016, provisional application No. 62/153,209, filed on Apr. 27, 2015.

(51) Int. Cl.
*F24F 11/00* (2018.01)
*F25B 49/02* (2006.01)
(Continued)

(52) U.S. Cl.
CPC ............ *F25B 49/022* (2013.01); *F24F 11/30* (2018.01); *F24F 11/83* (2018.01); *F25B 13/00* (2013.01);
(Continued)

(58) Field of Classification Search
CPC .......... F25B 2600/01; F25B 2600/0252; F25B 2600/11; F25B 2313/005; F25B 2313/007
(Continued)

(56) References Cited

U.S. PATENT DOCUMENTS

| 4,228,846 A | 10/1980 | Smorol |
| 4,257,238 A * | 3/1981 | Kountz ............... F24F 11/0009 |
| | | 62/176.3 |

(Continued)

FOREIGN PATENT DOCUMENTS

| CN | 1517624 A | 8/2004 |
| CN | 1873352 A | 12/2006 |

(Continued)

OTHER PUBLICATIONS

International Search Report regarding International Application No. PCT/US2016/029536, dated Sep. 12, 2016.

(Continued)

*Primary Examiner* — David Teitelbaum
*Assistant Examiner* — Paul Schwarzenberg
(74) *Attorney, Agent, or Firm* — Harness, Dickey & Pierce, P.L.C.

(57) ABSTRACT

A system includes a variable-capacity compressor operable in a first capacity mode and in a second capacity mode that is higher than the first capacity mode. A control module is configured to switch the variable-capacity compressor between the first capacity mode and the second capacity mode based on a demand signal from the thermostat. The control module determines a number of previous consecutive operating cycles of the variable-capacity compressor in the first capacity mode within a predetermined period of time. The control module operates the variable-capacity compressor in the second capacity mode in response to the number of previous consecutive operating cycles of the variable-capacity in the first capacity mode within the predetermined period of time exceeding a predetermined threshold.

20 Claims, 11 Drawing Sheets

(51) Int. Cl.
*F25B 13/00* (2006.01)
*F24F 11/30* (2018.01)
*F24F 11/83* (2018.01)
*F24F 110/10* (2018.01)
*F24F 110/12* (2018.01)
*F24F 110/20* (2018.01)

(52) U.S. Cl.
CPC ....... *F24F 2110/10* (2018.01); *F24F 2110/12* (2018.01); *F24F 2110/20* (2018.01); *F25B 2313/0314* (2013.01); *F25B 2600/021* (2013.01); *F25B 2700/2106* (2013.01); *Y02B 30/741* (2013.01)

(58) Field of Classification Search
USPC ....................................................... 62/176.6
See application file for complete search history.

(56) References Cited

U.S. PATENT DOCUMENTS

| | | | | |
|---|---|---|---|---|
| 5,062,276 | A * | 11/1991 | Dudley | F24F 11/00 62/176.6 |
| 5,129,234 | A * | 7/1992 | Alford | G05D 22/02 62/176.6 |
| 5,381,669 | A * | 1/1995 | Bahel | F25B 49/005 62/129 |
| 5,385,453 | A | 1/1995 | Fogt et al. | |
| 6,213,731 | B1 | 4/2001 | Doepker et al. | |
| 6,293,116 | B1 | 9/2001 | Forrest et al. | |
| 6,318,101 | B1 | 11/2001 | Pham et al. | |
| 6,450,409 | B1 | 9/2002 | Rowlette et al. | |
| 6,578,373 | B1 | 6/2003 | Barbier | |
| 6,679,072 | B2 | 1/2004 | Pham et al. | |
| 7,752,854 | B2 | 7/2010 | Singh et al. | |
| 7,845,179 | B2 | 12/2010 | Singh et al. | |
| 8,011,199 | B1 * | 9/2011 | Chen | F25B 49/022 62/228.5 |
| 8,209,073 | B2 | 6/2012 | Wijaya et al. | |
| 8,459,053 | B2 | 6/2013 | Pham et al. | |
| 8,485,789 | B2 | 7/2013 | Gu et al. | |
| 8,538,587 | B2 | 9/2013 | Hess et al. | |
| 8,585,382 | B2 | 11/2013 | Akei et al. | |
| 8,616,014 | B2 | 12/2013 | Stover et al. | |
| 8,863,536 | B1 | 10/2014 | Perry et al. | |
| 9,194,393 | B2 | 11/2015 | Pham | |
| 9,562,710 | B2 | 2/2017 | Pham et al. | |
| 9,709,311 | B2 | 7/2017 | Popli et al. | |
| 2003/0033823 | A1 | 2/2003 | Pham et al. | |
| 2003/0156946 | A1 | 8/2003 | Tolbert | |
| 2005/0155369 | A1 * | 7/2005 | Ootori | F25B 49/025 62/228.1 |
| 2006/0032253 | A1 | 2/2006 | Lee et al. | |
| 2006/0037332 | A1 | 2/2006 | Hwang et al. | |
| 2006/0156749 | A1 | 7/2006 | Lee et al. | |
| 2006/0260334 | A1 * | 11/2006 | Carey | F24F 3/1405 62/176.6 |
| 2006/0280627 | A1 | 12/2006 | Jayanth | |
| 2007/0012052 | A1 | 1/2007 | Butler et al. | |
| 2007/0032909 | A1 | 2/2007 | Tolbert et al. | |
| 2007/0079620 | A1 | 4/2007 | Lee | |
| 2007/0151267 | A1 | 7/2007 | Hatano et al. | |
| 2008/0135635 | A1 | 6/2008 | Deng et al. | |
| 2008/0286118 | A1 | 11/2008 | Gu et al. | |
| 2010/0064714 | A1 | 3/2010 | Tashiro | |
| 2010/0082162 | A1 | 4/2010 | Mundy et al. | |
| 2010/0107668 | A1 * | 5/2010 | Voorhis | F24F 3/153 62/176.3 |
| 2010/0179703 | A1 | 7/2010 | Singh et al. | |
| 2010/0218527 | A1 | 9/2010 | Kitagishi et al. | |
| 2010/0268397 | A1 | 10/2010 | Whitehurst et al. | |
| 2010/0275628 | A1 | 11/2010 | Moseley | |
| 2010/0314458 | A1 | 12/2010 | Votaw et al. | |
| 2011/0014890 | A1 | 1/2011 | Ajram et al. | |
| 2012/0090337 | A1 | 4/2012 | Chen et al. | |
| 2012/0185728 | A1 | 7/2012 | Guo et al. | |
| 2012/0297805 | A1 | 11/2012 | Kamada et al. | |
| 2012/0318007 | A1 | 12/2012 | Lukasse et al. | |
| 2014/0033746 | A1 | 2/2014 | McSweeney | |
| 2014/0262134 | A1 | 9/2014 | Arensmeier et al. | |
| 2016/0313039 | A1 | 10/2016 | Popli et al. | |
| 2016/0313040 | A1 | 10/2016 | Trudeau et al. | |
| 2017/0268812 | A1 | 9/2017 | Trudeau et al. | |
| 2017/0343230 | A1 | 11/2017 | Popli et al. | |
| 2017/0350633 | A1 | 12/2017 | Popli et al. | |

FOREIGN PATENT DOCUMENTS

| | | |
|---|---|---|
| EP | 2050958 A1 | 4/2009 |
| JP | H03160261 A | 7/1991 |
| JP | H09318140 A | 12/1997 |
| JP | 2745836 B2 | 4/1998 |
| KR | 100715999 B1 | 5/2007 |
| KR | 20070071090 A | 7/2007 |
| KR | 20100059522 A | 6/2010 |
| KR | 20130033847 A | 4/2013 |
| WO | WO-2009061301 A1 | 5/2009 |
| WO | WO-2015153766 A1 | 10/2015 |

OTHER PUBLICATIONS

Written Opinion of the International Searching Authority regarding International Application No. PCT/US2016/029536, dated Sep. 12, 2016.
International Search Report regarding International Application No. PCT/US2017/022563, dated Jun. 26, 2017.
Written Opinion of the International Searching Authority regarding International Application No. PCT/US2017/022563, dated Jun. 26, 2017.
International Search Report regarding International Application No. PCT/US2017/034510, dated Aug. 28, 2017.
Written Opinion of the International Searching Authority regarding International Application No. PCT/US2017/034510, dated Aug. 28, 2017.
Notice of Allowance and Fees Due dated May 25, 2017.
International Search Report regarding International Application No. PCT/US2016/029588, dated Aug. 9, 2016.
Written Opinion of the International Searching Authority regarding International Application No. PCT/US2016/029588, dated Aug. 9, 2016.
International Search Report regarding International Application No. PCT/US2016/029593, dated Aug. 10, 2016.
Written Opinion of the International Searching Authority regarding International Application No. PCT/US2016/029593, dated Aug. 10, 2016.
International Search Report regarding International Application No. PCT/US2016/029543, dated Aug. 9, 2016.
Written Opinion of the International Searching Authority regarding International Application No. PCT/US2016/029543, dated Aug. 9, 2016.
Non-Final Office Action regarding U.S. Appl. No. 15/138,771 dated Jun. 5, 2018.
Notice of Allowance regarding U.S. Appl. No. 15/651,942 dated Jul. 9, 2018.
Office Action regarding U.S. Appl. No. 15/457,418, dated Jul. 26, 2018.
Notice of Allowance regarding U.S. Appl. No. 15/651,942 dated Aug. 16, 2018.

* cited by examiner

| OAT (°F) | BASELINE T1 | OVERRIDE T1 |
|---|---|---|
| >90 | 5 seconds | If $T2_{n-1}>5min$, then $T1_n=5sec$, else $T1_n=40min$ |
| 85-90 | 30 minutes | If $T2_{n-1}>5min$, then $T1_n=5sec$, else $T1_n=40min$ |
| 80-85 | 35 minutes | Not applicable. See Baseline T1 Column. |
| 75-80 | 40 minutes | Not applicable. See Baseline T1 Column. |
| 70-75 | 50 minutes | Not applicable. See Baseline T1 Column. |
| 65-60 | 60 minutes | Not applicable. See Baseline T1 Column. |
| 60-65 | 60 minutes | Not applicable. See Baseline T1 Column. |
| 55-60 | 50 minutes | Not applicable. See Baseline T1 Column. |
| 50-55 | 40 minutes | Not applicable. See Baseline T1 Column. |
| 45-50 | 40 minutes | Not applicable. See Baseline T1 Column. |
| 40-45 | 30 minutes | If $T2_{n-1}>5min$, then $T1_n=5sec$, else $T1_n=20min$ |
| <40 | 5 seconds | If $T2_{n-1}>5min$, then $T1_n=5sec$, else $T1_n=20min$ |

FIG. 3

| Region | Sensible Load (temperature) | Latent Load (Humidity) | Indoor Blower Speed |
|---|---|---|---|
| Hot and Humid | Medium/low | High | Low |
| Very Hot/Dry | High | Low | High |
| Mixed-Mild | Medium/low | Low | Low/Medium |
| Mixed-Humid | Medium/low | Medium | Low |

FIG. 6

| Region- Hot and Humid | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 + reducing Y2 |
| Ambient temperature Slope | Neutral | Positive | Reducing | Reducing/ Neutral |
| Sensible Load | Low | Low | Medium | Medium/Low |
| Latent Load | Medium | High | Very High | High |

FIG. 7

| Region- Very Hot/Dry | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 + reducing Y2 |
| Ambient temperature Slope | Neutral | Positive | Reducing | Reducing/ Neutral |
| Sensible Load | Medium | Med/High | High | Med/Low |
| Latent Load | | | Low | |

FIG. 8

| Region-Mixed-Mild | 12 AM to 6 AM | 6 AM to 12 PM | 12 PM to 6 PM | 6 PM to 12AM |
|---|---|---|---|---|
| Y1/Y2 setting | Y1 | Y1 | Y1 + more Y2 | More Y1 + reducing Y2 |
| Ambient temperature Slope | Neutral | Positive | Reducing | Reducing/ Neutral |
| Sensible Load | Low | Low | Medium/High | Medium/Low |
| Latent Load | | | Low | |

FIG. 9

| Region- Hot and Humid | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 |
| Ambient temperature Slope | Neutral | Positive | Reducing | Reducing/ Neutral |
| Sensible Load | Low | Low | Medium/High | Medium/Low |
| Latent Load | Low | Low | Medium | Medium/Low |

FIG. 10

SYSTEM AND METHOD OF CONTROLLING A VARIABLE-CAPACITY COMPRESSOR

CROSS-REFERENCE TO RELATED APPLICATIONS

This application claims the benefit of U.S. Provisional Application No. 62/153,209, filed on Apr. 27, 2015, and U.S. Provisional Application No. 62/309,247, filed on Mar. 16, 2016. The entire disclosures of the above applications are incorporated herein by reference. In addition, the entire disclosures of the following applications are also incorporated herein by reference in their entirety: U.S. application Ser. No. 15/138,551, filed Apr. 26, 2016; U.S. application Ser. No. 15/138,937, filed Apr. 26, 2016; and U.S. application Ser. No. 15/138,771, filed Apr. 26, 2016.

FIELD

The present disclosure relates to a climate-control system having a variable-capacity compressor and to methods for controlling the climate-control system.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and a compressor circulating a working fluid (e.g., refrigerant or carbon dioxide) between the indoor and outdoor heat exchangers. Varying a capacity of the compressor can impact the energy-efficiency of the system and the speed with which the system is able to heat or cool a room or space.

SUMMARY

This section provides a general summary of the disclosure, and is not a comprehensive disclosure of its full scope or all of its features.

In one form, the present disclosure provides a system that may include: a variable-capacity compressor, a control module, and a thermostat. The variable-capacity compressor may be operable in a first capacity mode and in a second capacity mode that is higher than the first capacity mode. The control module may be configured to switch the variable-capacity compressor between the first capacity mode and the second capacity mode based on a demand signal from the thermostat. The control module may determine a number of previous consecutive operating cycles of the variable-capacity compressor in the first capacity mode within a predetermined period of time. The control module may operate the variable-capacity compressor in the second capacity mode in response to the number of previous consecutive operating cycles of the variable-capacity in the first capacity mode within the predetermined period of time exceeding a predetermined threshold.

In some configurations, the control module operates the variable-capacity compressor in the second capacity mode in response to an average runtime of the variable-capacity compressor in the first capacity mode during the predetermined period of time being less than a predetermined value.

In some configurations, the thermostat includes an indoor relative humidity sensor that generates indoor relative humidity data corresponding to an indoor relative humidity.

In some configurations, the control module operates the variable-capacity compressor in the second capacity mode in response to the indoor relative humidity exceeding a predetermined humidity.

In some configurations, the control module determines a slope of the indoor relative humidity and operates the variable-capacity compressor in the second capacity mode based on the slope of the indoor relative humidity.

In some configurations, the control module operates the variable-capacity compressor in the second capacity mode in response to a previous operating cycle being in the second capacity mode and the indoor relative humidity exceeding a predetermined humidity.

In some configurations, the control module sets a runtime of the variable-capacity compressor in the second capacity mode according to the indoor relative humidity.

In some configurations, the thermostat is further configured to measure an air temperature, receive a setpoint temperature, and generate the demand signal based on a difference between the air temperature and the setpoint temperature.

In some configurations, the control module includes an outdoor-air-temperature sensor that generates outdoor-air-temperature data corresponding to an outdoor-air-temperature.

In some configurations, the control module sets a runtime of the variable-capacity compressor in the second capacity mode according to the outdoor-air-temperature.

In another form, the present disclosure provides a method of controlling a variable-capacity compressor. The method may include receiving a demand signal from a thermostat. The method may also include operating a variable-capacity compressor, wherein the variable-capacity compressor is operable in a first capacity mode and in a second capacity mode that is higher than the first capacity mode. The method may also include switching between the first capacity mode and the second capacity mode based on the demand signal. The method may also include determining a number of previous consecutive operating cycles of the variable-capacity compressor in the first capacity mode within a predetermined period of time. The method may also include operating the variable-capacity compressor in the second capacity mode in response to the number of previous consecutive operating cycles of the variable-capacity compressor in the first capacity mode within the predetermined period of time exceeding a predetermined threshold.

In some configurations, the variable-capacity compressor operates in the second capacity mode in response to an average runtime of the variable-capacity compressor in the first capacity mode during the predetermined period of time being less than a predetermined value.

In some configurations, the thermostat includes an indoor relative humidity sensor that generates indoor relative humidity data corresponding to an indoor relative humidity.

In some configurations, the variable-capacity compressor operates in the second capacity mode in response to the indoor relative humidity exceeding a predetermined humidity.

In some configurations, the variable-capacity compressor operates in the second capacity mode based on a slope of the indoor relative humidity.

In some configurations, the variable-capacity compressor operates in the second capacity mode in response to a previous operating cycle being in the second capacity mode and the indoor relative humidity exceeding a predetermined humidity.

In some configurations, a runtime of the variable-capacity compressor in the second capacity mode is set according to the indoor relative humidity.

In some configurations, the thermostat is configured to measure an air temperature, receive a setpoint temperature, and generate the demand signal based on a difference between the air temperature and the setpoint temperature.

In some configurations, an outdoor-air-temperature sensor generates outdoor-air-temperature data corresponding to an outdoor-air-temperature.

In some configurations, the variable-capacity compressor in the second capacity mode is set according to the outdoor-air-temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a lookup table that can be used in the method and algorithm of FIG. 2;

FIG. 6 is a table illustrating relative sensible and latent loads for exemplary climate types;

FIG. 7 is a table providing data for a first climate type at various times of a day;

FIG. 8 is a table providing data for a second climate type at various times of a day;

FIG. 9 is a table providing data for a third climate type at various times of a day;

FIG. 10 is a table providing data for a fourth climate type at various times of a day;

Corresponding reference numerals indicate corresponding parts throughout the several views of the drawings.

DETAILED DESCRIPTION

Figure 1:
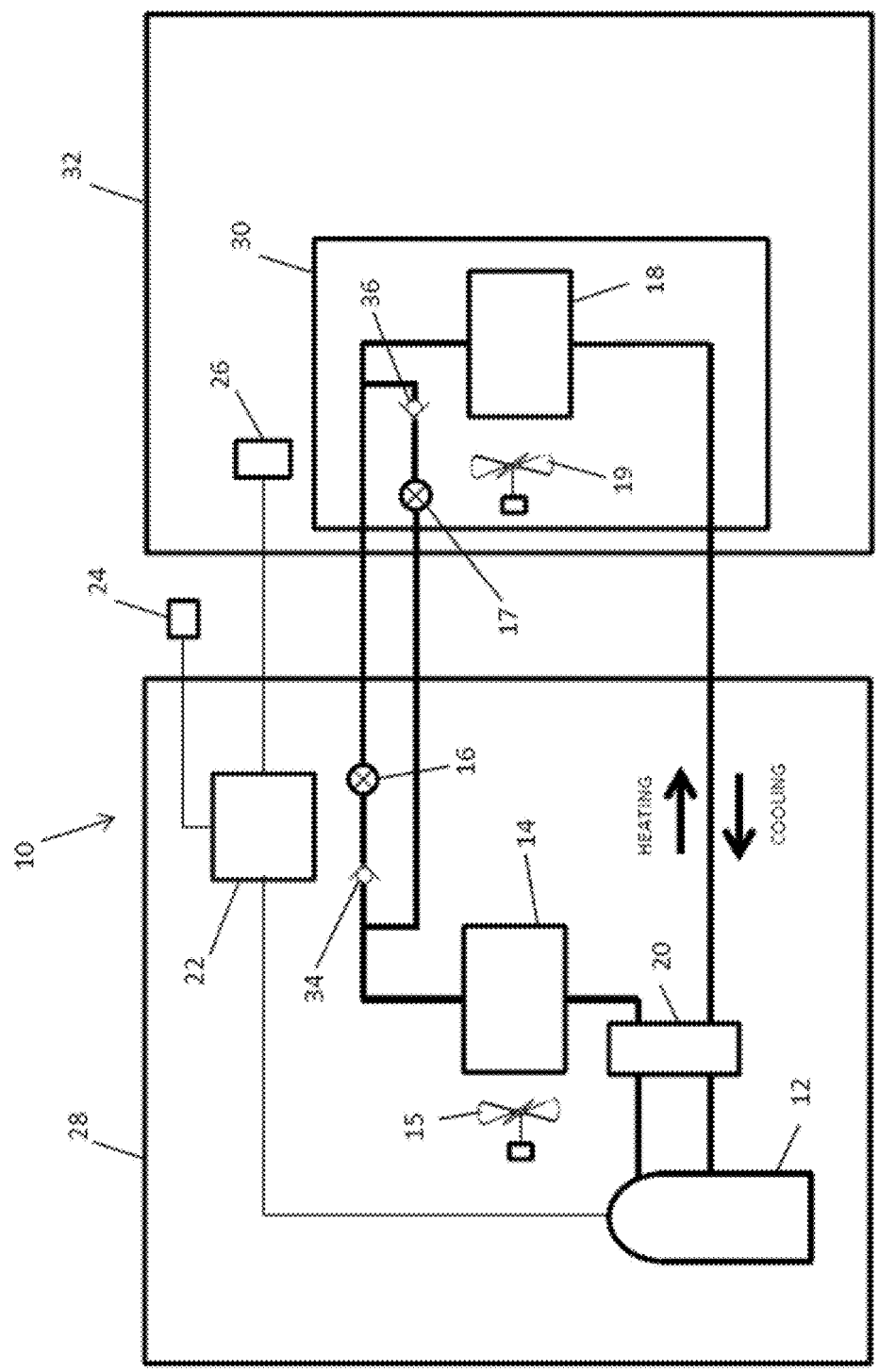
FIG. 1 is a schematic representation of a heat-pump system having a variable-capacity compressor according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a climate-control system 10 is provided that may include a variable-capacity compressor (or a variable-capacity group of compressors) 12, an outdoor heat exchanger 14, an outdoor blower 15, a first expansion device 16, a second expansion device 17, an indoor heat exchanger 18, and an indoor blower 19. In the particular configuration shown in FIG. 1, the system 10 is a heat-pump system having a reversing valve 20 operable to control a direction of working fluid flow through the system 10 to switch the system 10 between a heating mode and a cooling mode. In some configurations, the system 10 may be an air-conditioning system or a refrigeration system, for example, and may be operable in only the cooling mode.

As will be described in more detail below, a controller or control module 22 may control operation of the compressor 12 and may switch the compressor 12 between a low-capacity mode and a high-capacity mode based on data received from an outdoor-air-temperature sensor 24, a signal received from a thermostat 26, a comparison between a runtime T of the compressor 12 and a predetermined low-capacity runtime T1, and/or a comparison between a previous high-capacity runtime T2 with a predetermined value. The control module 22 may minimize or reduce employment of high-capacity-mode operation to minimize or reduce energy usage while maintaining an acceptable level of comfort within a space to be heated or cooled.

The compressor 12 can be or include a scroll compressor, a reciprocating compressor, or a rotary vane compressor, for example, and/or any other type of compressor. The compressor 12 may be any type of variable-capacity compressor that is operable in at least a low-capacity mode and a high-capacity mode. For example, the compressor 12 may be or include a multi-stage compressor, a group of independently operable compressors, a multi-speed or variable-speed compressor (having a variable-speed or multi-speed motor), a compressor having modulated suction (e.g., blocked suction), a compressor having fluid-injection (e.g., an economizer circuit), a pulse-width-modulated scroll compressor configured for scroll separation (e.g., a digital scroll compressor), a compressor having variable-volume-ratio valves configured to leak intermediate-pressure working fluid, or a compressor having two or more of the above capacity modulation means. It will be appreciated that the compressor 12 could include any other additional or alternative structure for varying its capacity and/or the operating capacity of the system 10.

It will be appreciated that the low-capacity and/or high-capacity modes may be continuous, steady-state operating modes, or compressor 12 may be modulated (e.g., pulse-width-modulated) during operation in the low-capacity mode and/or during operation in the high-capacity mode. Exemplary variable-capacity compressors are disclosed in assignee's commonly owned U.S. Pat. No. 8,616,014, U.S. Pat. No. 6,679,072, U.S. Pat. No. 8,585,382, U.S. Pat. No. 6,213,731, U.S. Pat. No. 8,485,789, U.S. Pat. No. 8,459,053, and U.S. Pat. No. 5,385,453, the disclosures of which are hereby incorporated by reference.

The compressor 12, the outdoor heat exchanger 14, the outdoor blower 15, the first expansion device 16 and the reversing valve 20 may be disposed in an outdoor unit 28. The second expansion device 17, the indoor heat exchanger 18 and the indoor blower 19 may be disposed within an indoor unit 30 (e.g., an air handler or furnace) disposed within a home or other building 32. A first check valve 34 may be disposed between outdoor heat exchanger 14 and the first expansion device 16 and may restrict or prevent fluid flow through the first expansion device 16 in the cooling mode and may allow fluid flow through the first expansion device 16 in the heating mode. A second check valve 36 may be disposed between the second expansion device 17 and the indoor heat exchanger 18 and may restrict or prevent fluid flow through the second expansion device 17 in the heating mode and may allow fluid flow through the second expansion device 17 in the cooling mode.

The outdoor-air-temperature sensor 24 is disposed outside of the building 32 and within or outside of the outdoor unit 28 and is configured to measure an outdoor ambient air temperature and communicate the outdoor ambient air temperature value to the control module 22 intermittently, continuously or on-demand. In some configurations, the outside-air-temperature sensor 24 could be a thermometer or other sensor associated with a weather monitoring and/or weather reporting system or entity. In such configurations, the control module 22 may obtain the outdoor-air temperature (measured by the sensor 24) from the weather monitoring and/or weather reporting system or entity via, for example, an internet, Wi-Fi, Bluetooth®, Zigbee®, power-line carrier communication (PLCC), or cellular connection or any other wired or wireless communication protocol.

For example, the control module 22 may communicate with the weather monitoring and/or weather reporting system or entity over the internet via a Wi-Fi connection to a Wi-Fi router located in or associated with the building 32. The thermostat 26 is disposed inside of the building 32 and outside of the indoor unit 30 and is configured to measure an air temperature within a room or space to be cooled or heated by the system 10. The thermostat 26 can be a single-stage thermostat, for example, that generates only one type of demand signal in response to a temperature within the room or space rising above (in the cooling mode) or falling below (in the heating mode) a setpoint temperature. The control module 22 could be disposed in any suitable location, such as inside of or adjacent to the outdoor unit 28 or inside of or adjacent to the indoor unit 30, for example.

In the cooling mode, the outdoor heat exchanger 14 may operate as a condenser or as a gas cooler and may cool discharge-pressure working fluid received from the compressor 12 by transferring heat from the working fluid to air forced over the outdoor heat exchanger 14 by the outdoor blower 15, for example. The outdoor blower 15 could include a fixed-speed, multi-speed or variable-speed fan. In the cooling mode, the indoor heat exchanger 18 may operate as an evaporator in which the working fluid absorbs heat from air forced over the indoor heat exchanger 18 by the indoor blower 19 to cool a space within the home or building 32. The indoor blower 19 could include a fixed-speed, multi-speed or variable-speed fan. In the heating mode, the outdoor heat exchanger 14 may operate as an evaporator, and the indoor heat exchanger 18 may operate as a condenser or as a gas cooler and may transfer heat from working fluid discharged from the compressor 12 to a space to be heated.

Figure 2:
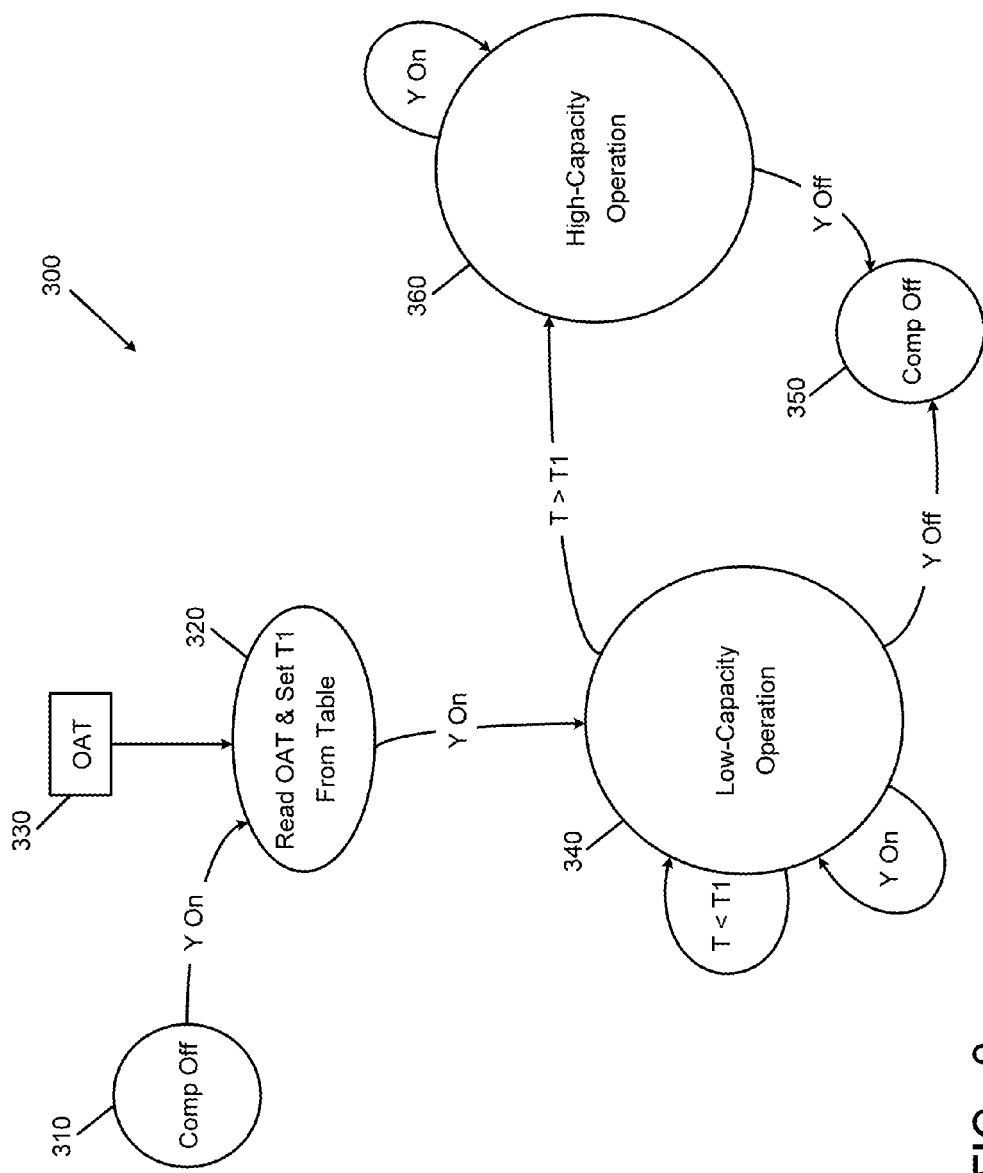
FIG. 2 is a state diagram illustrating another method and algorithm for controlling the variable-capacity compressor of FIG. 1.

Referring now to FIG. 2, a method and control algorithm 300 will be described that can be executed by the control module 22. The algorithm 300 may control operation of the compressor 12 and switch the compressor 12 between the low-capacity and high-capacity modes. In an initial state 310, the compressor 12 may be off. The thermostat 26 may send a demand signal Y to the control module 22 in response to an air temperature in the space to be heated or cooled by the system 10 dropping below (in the heating mode) or rising above (in the cooling mode) a selected setpoint temperature. In response to receipt of the demand signal Y, the control module 22 may initiate operation of the compressor 12 in the low-capacity mode (state 340) and simultaneously, at state 320, read an outdoor air temperature (received from sensor 24 at input 330) and set a low-capacity runtime T1 based on data from table 345 (FIG. 3).

Thereafter, the compressor 12 may continue to run in the low-capacity mode until the cooling demand is satisfied (i.e., the temperature in the space to be cooled drops below the selected setpoint temperature as indicated by the thermostat 26 and the thermostat switches the demand signal Y to "off"), until the total runtime T of the compressor 12 since the receipt of the demand signal Y surpasses the low-capacity runtime T1 set at state 320, or until the compressor 12 or system 10 is manually shutdown or a diagnostic or protection algorithm overrides the algorithm 300.

If demand is satisfied before the total runtime T reaches the predetermined low-capacity runtime T1, the control module 22 may shutdown the compressor 12 (state 350). If the compressor 12 has been running for longer than the predetermined low-capacity runtime T1 without satisfying the demand, the control module 22 may switch the compressor 12 from the low-capacity mode to the high-capacity mode (state 360). The compressor 12 may continue to run in the high-capacity mode until the cooling demand is satisfied (or until the compressor 12 or system 10 is manually shutdown or a diagnostic or protection algorithm overrides the algorithm 100). When demand is satisfied, the control module 22 may shutdown the compressor 12 (state 350). When the compressor 12 is shut down after satisfying demand by operating in the high-capacity mode, the control module 22 may record the runtime T2 of the compressor 12 in the high-capacity mode and store the high-capacity runtime T2 in a memory module associated with the control module 22.

As described above, FIG. 3 depicts the table 345 from which the control module 22 determines the low-capacity runtime T1. First, the control module 22 determines from which row of the table 345 to read based on the outdoor ambient temperature (OAT) value received at input 330. That is, the row of the table 345 from which the control module 22 reads is the row having an OAT range that includes the OAT value received at input 330. If the control module 22 has not received a demand signal Y from the thermostat 26 in a relatively long predetermined period of time (e.g., days, weeks or longer), the control module 22 may initially set the low-capacity runtime T1 at a default or baseline value listed in the Baseline T1 column at the corresponding OAT row of table 345.

With the low-capacity runtime T1 set at the baseline value corresponding to the OAT at the time of the initiation of the demand signal Y, the control module 22 may cause the compressor 12 to run in the low-capacity mode (state 340) until demand is met or until the compressor runtime T surpasses the set low-capacity runtime T1. If demand has not been met when the runtime T reaches the set low-capacity runtime T1, the control module 22 may switch the compressor 12 to the high-capacity mode (state 360). The compressor 12 may continue operating in the high-capacity mode until demand is met. Once demand is met, the controller 22 may record in the high-capacity runtime T2, as described above.

Upon receipt of a subsequent demand signal Y, the control module 22 may again determine a low-capacity runtime value T1 from the table 345. This time, the control module 22 may determine if the OAT falls within one of a plurality of override ranges 347. For example, override ranges 347 in the cooling mode may include 85-90° F. and >90° F., and override ranges 347 in the heating mode may include 40-45° F. and <40° F. If the OAT value received at input 330 falls within one of the override ranges 347, the control module 22 may set the low-capacity runtime T1 at an override value determined by referencing the override T1 column at the corresponding OAT row.

The override value for the low-capacity runtime T1 may be determined based on a previous high-capacity runtime $T2_{n-1}$. For example, if the previous high-capacity runtime $T2_{n-1}$ is greater than a predetermine value (e.g., five minutes), the control module 22 may set the low-capacity runtime T1 to a first value (e.g., a short time period such as five seconds). If the previous high-capacity runtime $T2_{n-1}$ is less than the predetermine value (e.g., five minutes), the control module 22 may set the low-capacity runtime T1 to a second value (e.g., a longer time period such as twenty minutes or forty minutes). The control module 22 may then cause the compressor 12 to run in the low-capacity mode (state 340) until demand is met or until the compressor runtime T reaches the low-capacity runtime T1, at which time the control module 22 may switch the compressor to the high-capacity mode (state 360).

If the OAT falls within an OAT range that is not one of the override ranges 347, then the control module 22 will continue to set the low-capacity runtime T1 at the baseline value listed in the baseline T1 column. As described above, the control module 22 may cause the compressor 12 to run in the low-capacity mode until demand is met or until the compressor runtime T reaches the low-capacity runtime T1, at which time the control module 22 may switch the compressor 12 to the high-capacity mode until demand is met.

In another configuration, the algorithm 300 may include determining the low-capacity runtime T1 based on table 445 (FIG. 4) instead of table 345. As described above, the control module 22 may continuously or intermittently receive OAT data from the sensor 24 and may store the OAT data in a memory module. As described above, once the demand signal Y is received, the control module 22 may, at state 320, read the current OAT (from input 330) and set the low-capacity runtime T1 from the table 445.

If the control module 22 has not received a demand signal Y from the thermostat 26 in a relatively long predetermined period of time (e.g., days, weeks or longer), the control module 22 may initially set the low-capacity runtime T1 at a default or baseline value listed in Baseline T1 column 446 at the OAT row of table 445 that corresponds to the current OAT received at input 330. With the low-capacity runtime T1 set at the baseline value, the control module 22 may then cause the compressor 12 to operate in the low-capacity mode (state 340) until demand is met, or until the compressor runtime T reaches the set low-capacity runtime T1, at which time the control module 22 will run the compressor 12 in the high-capacity mode (state 360) until demand is met, in accordance with the algorithm 300 described above. The control module 22 may record the high-capacity runtime T2 for each run cycle of the compressor 12.

Upon receipt of a subsequent demand signal Y, the control module 22 may again determine a low-capacity runtime value T1 from the table 445. This time, the control module 22 may read the current OAT and determine a slope of the OAT over a predetermined time period (e.g., over the last twenty minutes, but may be any predetermined period of time that is suitably indicative of system conditions). If the OAT slope is within a neutral slope range (where the slope is greater than −0.3 degrees per 20 minutes and less than 0.3 degrees per 20 minutes, for example), then the control module 22 may set the low-capacity runtime T1 at the baseline value listed in the Baseline T1 column 446 at the OAT row of table 445 that corresponds to the current OAT. If the OAT slope is within a positive slope range (where the slope is greater than 0.3 degrees per 20 minutes, for example), then the control module 22 may set the low-capacity runtime T1 at the value listed in the Positive OAT Slope column 447 at the OAT row of table 445 that corresponds to the current OAT. If the OAT slope is within a first negative slope range (where the slope is less than −0.3 degrees per 20 minutes and greater than −0.6 degrees per 20 minutes, for example), then the control module 22 may set the low-capacity runtime T1 at the value listed in the Negative OAT Slope column 448 at the OAT row of table 445 that corresponds to the current OAT. If the OAT slope is within a second negative slope range (where the slope is less than −0.6 degrees per 20 minutes, for example), then the control module 22 may set the low-capacity runtime T1 at the value listed in the Extreme Negative OAT Slope column 449 at the OAT row of table 445 that corresponds to the current OAT.

While the OAT slope is described above as being determined over a predetermined time period, the OAT slope could also be determined by comparing OAT values at the beginning of a current compressor operating cycle (i.e., when the current demand signal Y is received) and at the end of the previous compressor operating cycle (i.e., when the last demand signal Y switched off). Still other methods for determining the OAT slope could be employed.

Figure 4:
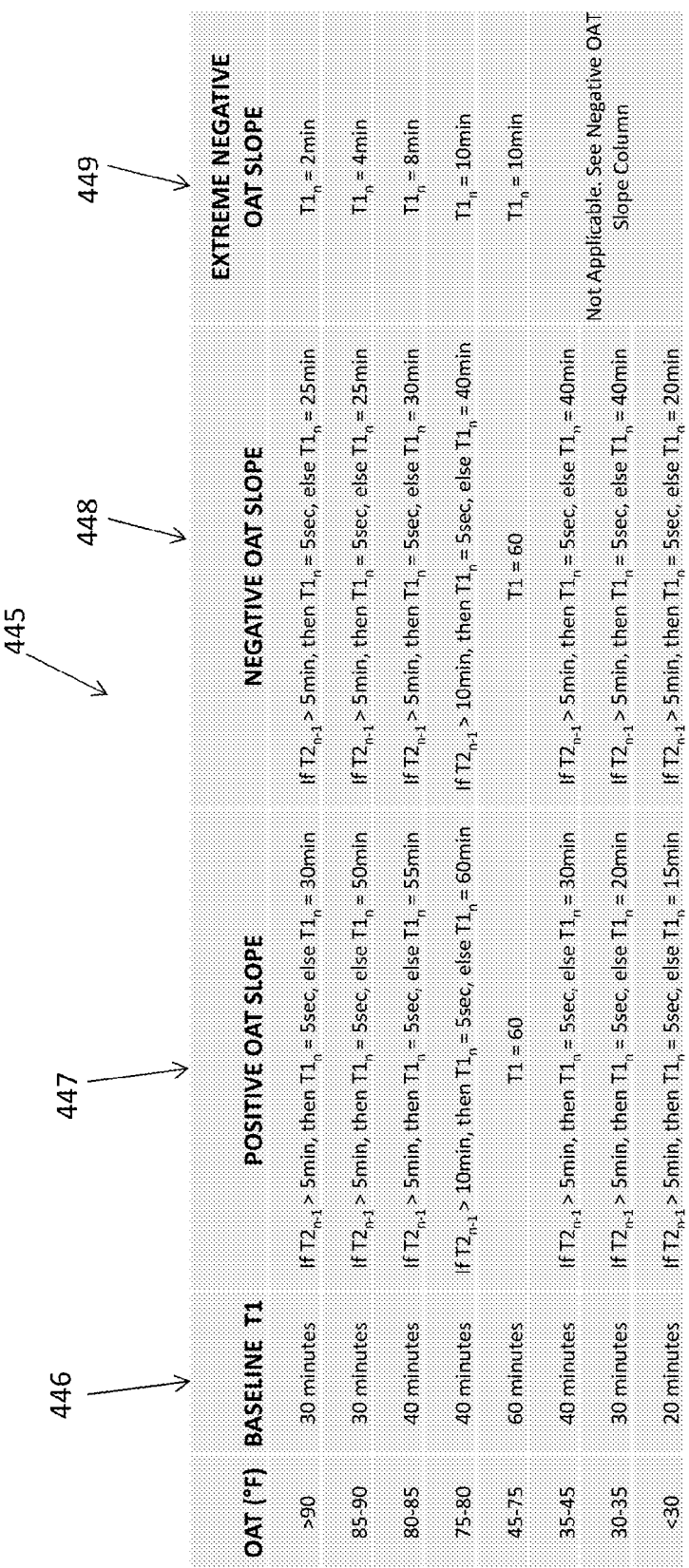
FIG. 4 is another lookup table that can be used in the method and algorithm of FIG. 2.

As shown in FIG. 4, some or all of the rows of column 447 and column 448 include steps for determining the low-capacity runtime T1 based on the previous high-capacity runtime $T2_{n-1}$ (i.e., the high-capacity runtime T2 of the previous run cycle in which the demand signal Y was constantly on or demand for heating or cooling was constantly present). For example, in the row of the Positive OAT Slope column 447 corresponding to an OAT of greater than 90° F.: if the previous high-capacity runtime $T2_{n-1}$ was greater than five minutes, then the current low-capacity runtime $T1_n$ should be set to five seconds; and if the previous high-capacity runtime $T2_{n-1}$ was less than or equal to five minutes, then the current low-capacity runtime $T1_n$ should be set to thirty minutes. As shown in FIG. 4, the above time and temperature values may vary for the various rows of columns 447 and 448.

Further, as shown in FIG. 4, the Extreme Negative OAT Slope column 449 may simply include predetermined values for each OAT range that may not be dependent upon a previous high-capacity runtime. In some configurations, the Extreme Negative OAT Slope column 449 may refer the algorithm to the Negative OAT Slope column 448 for colder OAT ranges (e.g., below 45° F.). For example, if the OAT slope is less than −0.6 degrees per 20 minutes and the current OAT is less than 45° F., the control module 22 may set the low-capacity runtime T1 in accordance with the Negative OAT Slope column 448.

After setting the low-capacity runtime T1 in accordance with table 445, the control module 22 may operate the compressor 12 in the low-capacity mode (state 340) until demand is met, or until the compressor runtime T reaches the set low-capacity runtime T1 (at which time the control module 22 will switch the compressor to the high-capacity mode until demand is met), in accordance with the algorithm 300 described above.

OAT slope is generally a good indicator or estimate of the time of day. Therefore, adjusting low-capacity and high-capacity runtimes based on OAT slope effectively adjusts low-capacity and high-capacity runtimes to account for the diurnal temperature profile. That is, during the course of a day, the OAT often changes according to a fairly standard profile. When the OAT is rising in the morning, the total compressor runtime T is typically shorter (during the cooling season) than when the OAT is falling in the evening because the house or building in which the system 10 is installed has accumulated a thermal load throughout the day that is still present in the evening. For the heating mode, the load shifts to early morning, i.e., more high-capacity runtime during positive slope periods or early morning part of day, and less low-capacity runtime during negative slope periods or evenings, since the house or building absorbs heat during the day. Therefore, adjusting the low-capacity and high-capacity runtimes based on OAT slope or time of day accounts for the thermal load on the house or building and increases comfort for the occupants.

Figure 5:
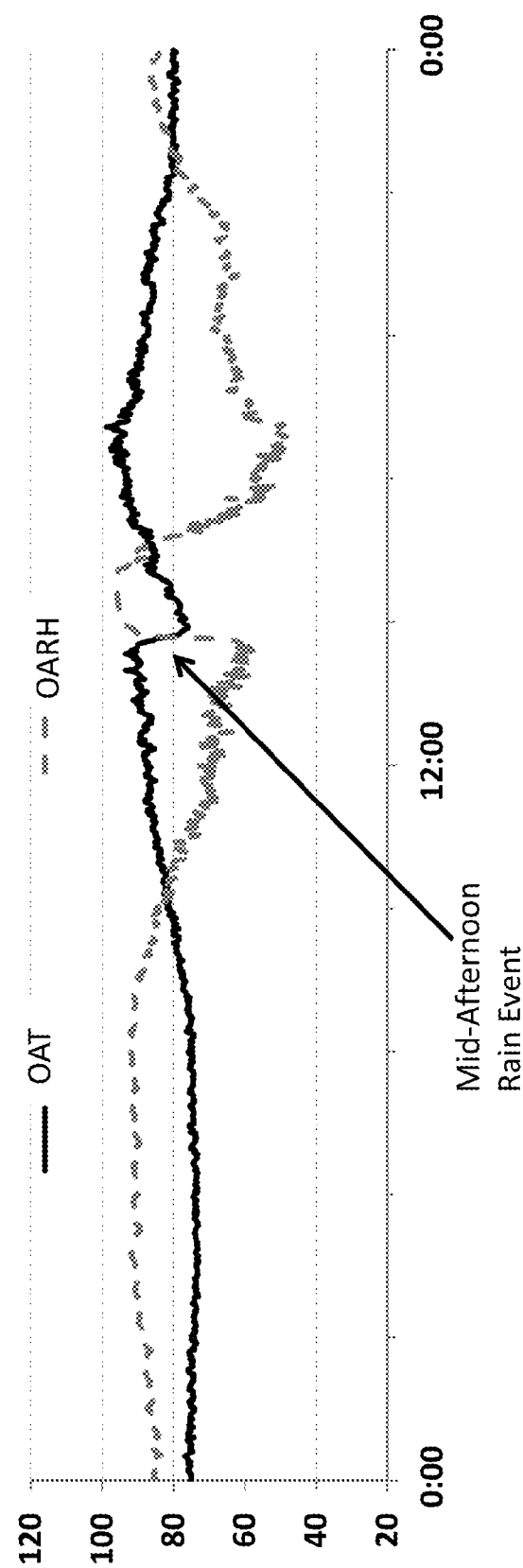
FIG. 5 is a graph depicting outdoor ambient temperature and outdoor ambient relative humidity versus time of day for an exemplary geographical location.

Furthermore, outdoor ambient relative humidity (OARH) often rises as OAT decreases and falls as OAT increases (as shown in FIG. 5). Therefore, OAT slope also indicates or approximates the slope of OARH. Thus, extreme negative OAT slopes (e.g., OAT slope less than −0.6 degrees per 20 minutes) can indicate an increased demand for dehumidification due to a mid-afternoon rain event, for example. Therefore, determining the OAT slope and adjusting low-capacity and high-capacity runtimes based on the OAT slope allows the algorithm 300 to account for the thermal load of the house or building and thermal load delay due to diurnal profile and allows the algorithm 300 to account for slope of ambient relative humidity without the use of a relative humidity sensor.

FIG. 5 depicts the OAT and OARH profile for a given day at a given location. As shown in FIG. 5, a mid-afternoon rain event can be accompanied by a sharp decrease in OAT and a corresponding sharp increase in OARH. Therefore, even though the OAT has decreased as a result of the rain event, demand for cooling may remain high due to the increased humidity and the possibility of OAT returning to its previous high before sunset. Therefore, such events having an extreme negative OAT slope are accounted for in table 445 (FIG. 4) at the Extreme Negative OAT Slope column 449, which assigns a very short low-capacity runtime T1 regardless of the length of any previous high-capacity runtime.

As described above, the indoor blower 19 (FIG. 1) could be a multi-speed blower that can be set at two or more speeds. Therefore, the system 10 may be operable in at least four different modes. In a first mode, the compressor 12 may operate in the low-capacity mode, and the indoor blower 19 may operate at a low speed. In a second mode, the compressor 12 may operate in the low-capacity mode, and the indoor blower 19 may operate at a high speed. In a third mode, the compressor 12 may operate in the high-capacity mode, and the indoor blower 19 may operate at the low speed. In a fourth mode, the compressor 12 may operate in the high-capacity mode, and the indoor blower 19 may operate at the high speed.

In some configurations, the speed of the indoor blower 19 may be set manually (e.g., by an installation contractor) and thereafter, the speed of the indoor blower 19 may be fixed at that speed. The speed of the indoor blower 19 could be selected based on the climate of the region (specifically, temperatures and humidity levels) in which the system 10 is installed. For example, as shown in FIG. 6, in regions with hot and humid climates (e.g., sub-tropical and tropical climates), the indoor blower 19 may be set to the low setting because lower indoor blower speeds are advantageous for faster dehumidification. In regions with very hot and dry climates (e.g., desert climates like the Southwest United States), the indoor blower 19 may be set to the high setting because higher indoor blower speeds are more advantageous for quickly reducing sensible heat. In regions with mixed temperatures and mild humidity, the indoor blower 19 may be set to the low or medium setting. In regions with mixed temperatures and higher humidity, the indoor blower 19 may be set to the low setting.

In the configurations in which the speed of the indoor blower 19 is set at installation and is fixed thereafter, the system 10 (having variable-capacity compressor 12) can be modulated between two modes: either between the first and third modes described above or between the second and fourth modes described above.

In other configurations, the control module 22 may be in communication with the indoor blower 19 and may be configured to modulate the speed of the indoor blower 19. In such configurations, the control module 22 may be configured to switch the system 10 among the first, second, third and fourth modes (i.e., by modulating the compressor 12 between the low-capacity and high-capacity modes and by modulating the indoor blower 19 between high and low speeds). The control module 22 may switch among the first, second, third and fourth modes depending on OAT, OAT slope, time of day, low-capacity and high-capacity runtimes T1, T2, indoor relative humidity, outdoor relative humidity, historical weather data and/or forecasted weather data, for example.

It will be appreciated that the tables 345 and 445 and runtimes T1, T2 could also be adjusted based on the climate of the region in which the system 10 is installed. FIGS. 7-10 provide overviews of the exemplary regions of FIG. 6 including low-capacity/high-capacity (Y1/Y2) compressor settings, OAT slopes, sensible loads and latent loads at various times of the day.

Figure 11:
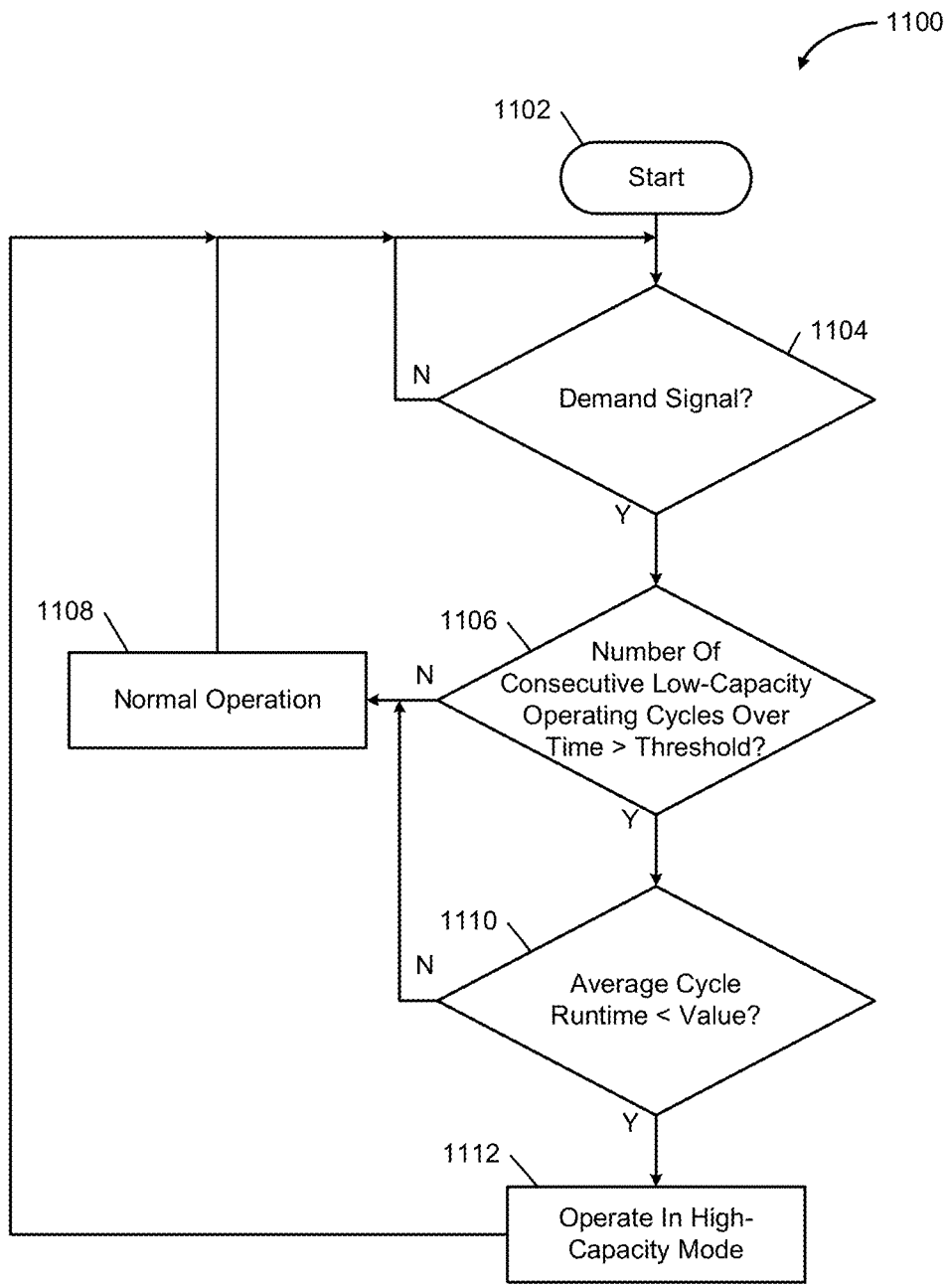
FIG. 11 is a flow chart illustrating an implementation of a method and algorithm for controlling the variable-capacity compressor of FIG. 1.

Referring now to FIG. 11, a method and control algorithm 1100 is presented that can be executed by the control module 22 for operation when the variable-capacity compressor 12 operates multiple, short, low-capacity cycles over a predetermined period of time. For example, when the thermostat 26 sends a demand signal Y and the control module 22 initiates operation of the compressor 12 in the low-capacity mode, as long as the air temperature increases or decreases to the setpoint temperature (i.e., the demand is satisfied) before the total runtime T equals or exceeds the low-capacity runtime T1, the compressor 12 may never need to switch to high-capacity mode. While running the compressor 12 in low-capacity mode minimizes energy usage, energy efficiency can be reduced if there are multiple low-capacity mode operations within a short period of time. In particular, operating the compressor 12 in low-capacity mode multiples times, with each runtime having a short duration, may cause cycle losses and start or stop losses, which can decrease the efficiency of the system.

Additionally, such rapid cycling may occur during cooling demands due to a higher latent load (e.g., higher humidity) and operating the compressor in low-capacity mode multiple times may not sufficiently decrease the humidity within the space to be cooled. In such case, dehumidification may be better remedied by operating the compressor in high-capacity mode.

The method and algorithm 1100 starts at 1102. At 1104, the control module 22 determines whether there is a demand signal. For example, the thermostat 26 may determine when an air temperature rises above a setpoint temperature and then may produce the demand signal Y to turn the compressor 12 on. As described above, in response to the demand signal Y, the control module 22 may initially operate the compressor 12 in the low-capacity mode. If there is no demand signal, control loops back to 1104 until there is a demand signal. Once there is a demand signal, the control module 22 proceeds to 1106 and compares the number of consecutive low-capacity operating cycles that have occurred over a predetermined period of time. If the number of consecutive low-capacity operating cycles over that predetermined period of time exceeds a predetermined threshold, the control module 22 continues to 1110.

For example, the predetermined threshold of consecutive low-capacity operating cycles may be five within an eighty-minute period. If the compressor 12 were to be operated in the low-capacity operating mode another time within the previous eighty minutes, the predetermined threshold will have been exceeded within the predetermined period of time. If the set threshold has not been exceeded, the control module 22 continues to 1108 and runs the compressor 12 according to normal operation, as described above, which may include running the compressor 12 initially in the low-capacity mode.

At 1106, when the threshold has been exceeded, the control module 22 continues to 1110 and determines whether the average length of each of the previous low-capacity runtimes that occurred within the predetermined period of time is below a predetermined value. For example, the average runtime length may be set not to exceed ten minutes. For example, if there have been over five consecutive low-capacity operating cycles that have each operated, on average, for less than ten minutes, the control module 22 continues to 1112 and bypasses the low-capacity mode, operating the compressor 12 in high-capacity mode.

Under these circumstances, high-capacity mode is more desirable as the air temperature repeatedly increases beyond the thermostat 26 setpoint temperature within a short period of time, resulting in inefficiencies and losses and/or in lower dehumidification. Operating in high-capacity mode may prevent the air temperature from increasing quickly and creating a subsequent, rapidly issued demand signal, avoiding start and stop losses. However, if the average low-capacity runtimes are above the predetermined value, i.e., ten minutes, the control module 22 continues to 1108, operating the compressor 12 according to normal operation as described above.

Figure 12:
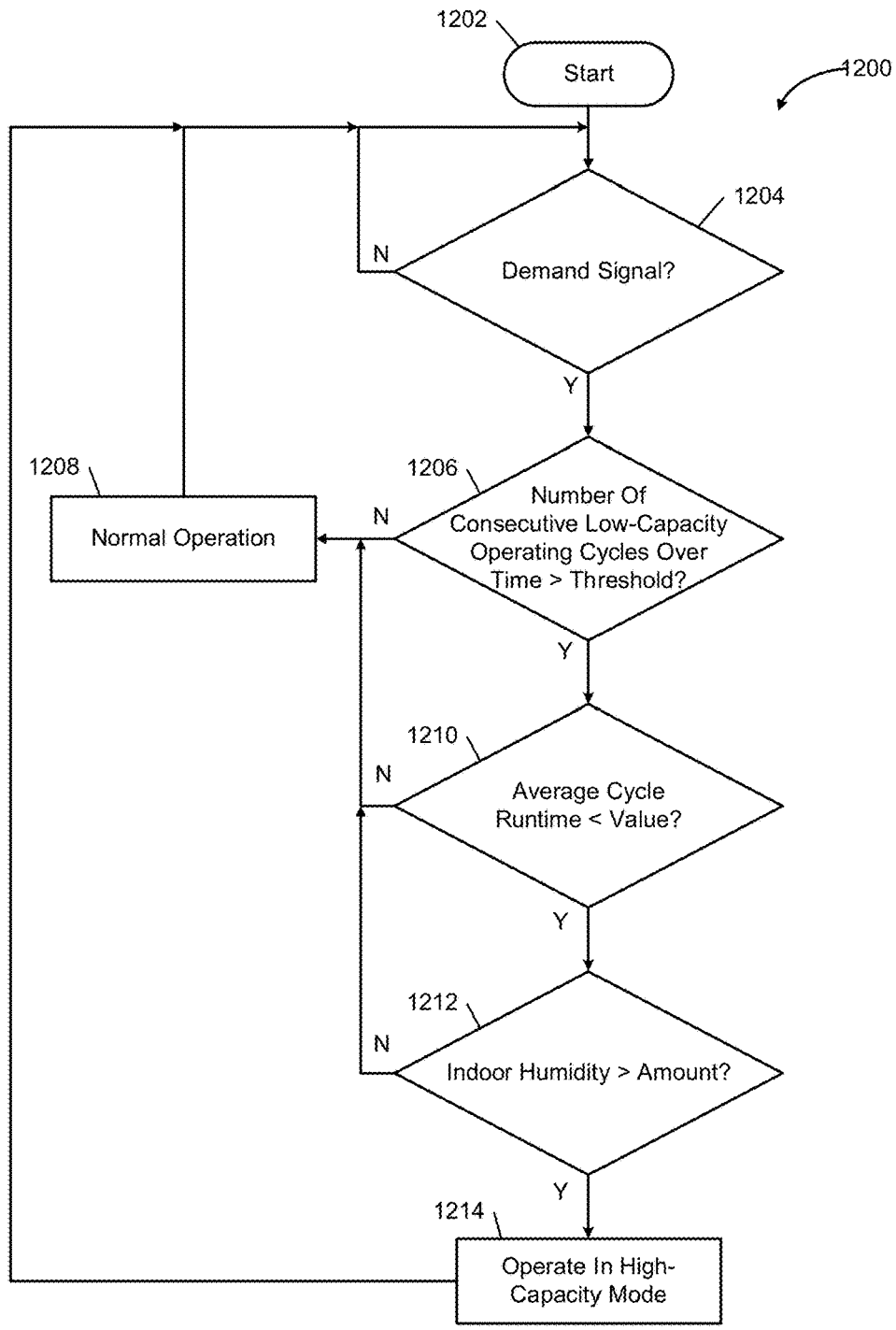
FIG. 12 is a flow chart illustrating another implementation of a method and algorithm for controlling the variable-capacity compressor of FIG. 1.

Referring now to FIG. 12, a method and control algorithm 1200 is presented that can be executed by the control module 22 as an alternative implementation when multiple, short, low-capacity cycles have been operated when the humidity is high. The method and control algorithm 1200 begins at 1202. At 1204 the control module 22 determines whether a demand signal has been received. If no demand signal has been received, the control module 22 loops back to 1204 until the demand signal is received. The control module 22 continues to 1206 when the demand signal has been received and determines whether a predetermined threshold of a number of consecutive low-capacity operating cycles within a predetermined period of time has been exceeded as discussed above with reference to FIG. 11. If the predetermined threshold has not been exceeded, the control module 22 continues with normal operation at 1208.

As discussed above with reference to FIG. 11, when the predetermined threshold has been exceeded, at 1210 the control module 22 determines whether the average length of each of the previous low-capacity runtimes that occurred within the predetermined period of time is below a predetermined value. If the average runtimes of the previous number of low-capacity operating cycles is over the predetermined value, the control module 22 continues with normal operation at 1208. If the average runtimes of the previous number of low-capacity operating cycles is less than the predetermined value, the control module 22 continues to 1212.

At 1212, the control module 22 determines whether the indoor humidity exceeds a threshold amount. The control module 22, for example, may be in communication with an indoor humidity sensor. In particular, the thermostat 26 may include a humidity sensor and may communicate indoor humidity data to the control module 22. The indoor humidity threshold, for example, could be 50% humidity. At 1212, the control module 22 determines whether the latent load (humidity) is high by comparing the indoor humidity with the indoor humidity threshold. When the indoor humidity is greater than the indoor humidity threshold, to avoid further rapid cycling and provide dehumidification, the control module 22 continues to 1214 and bypasses the low-capacity mode by operating the compressor 12 in high-capacity mode. At 1212, when the indoor humidity is less than the threshold amount, the control module 22 continues with normal operation at 1208, as discussed above.

In another implementation, the control module 22 can instead consider the indoor relative humidity slope over the predetermined period of time, for example eighty minutes as previously discussed. If the control module 22 determines that the indoor humidity slope is increasing over the predetermined period of time, the need for dehumidification is confirmed.

Figure 13:
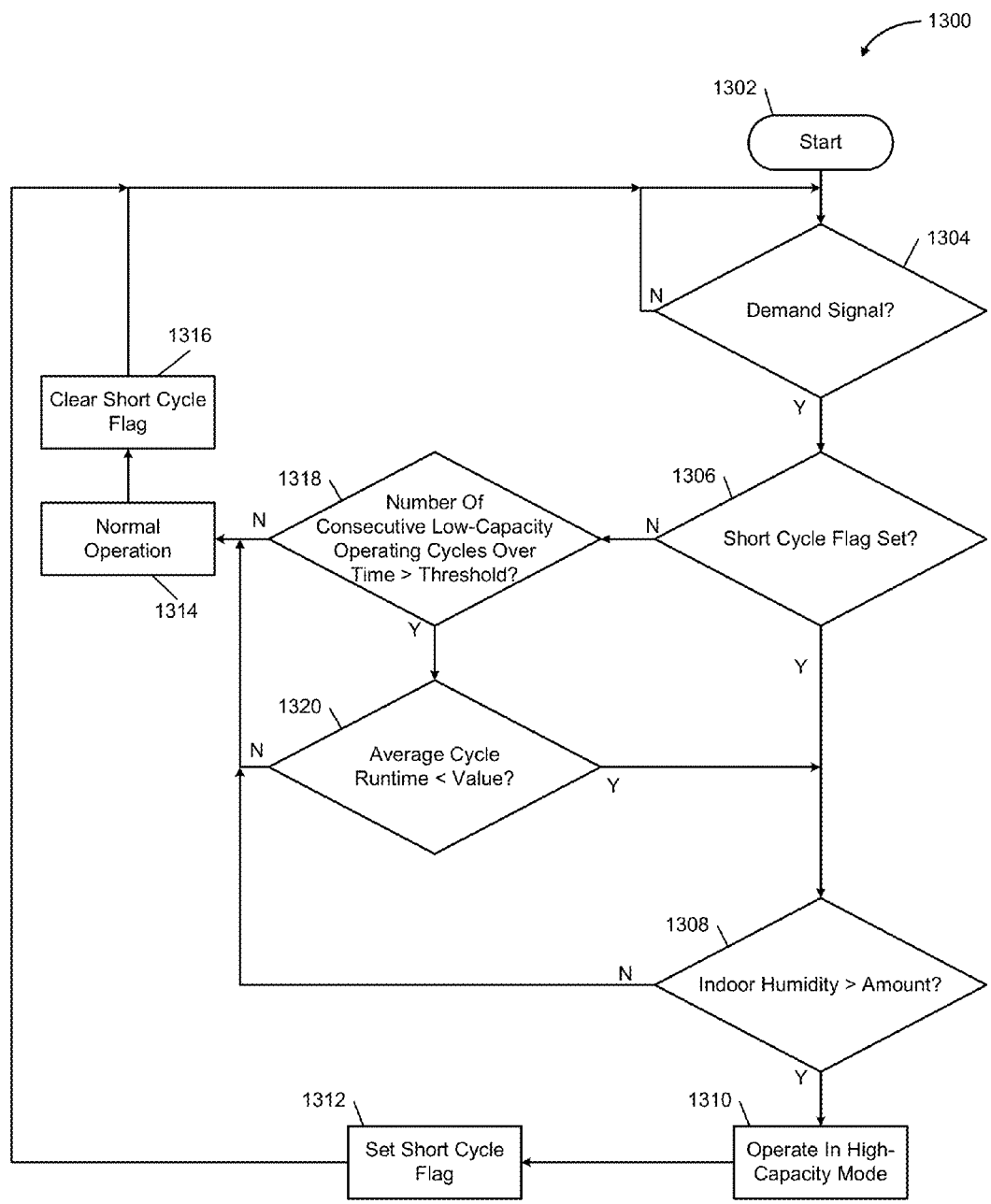
FIG. 13 is a flow chart illustrating another implementation of a method and algorithm for controlling the variable-capacity compressor of FIG. 1.

Referring now to FIG. 13, a method and control algorithm 1300 is presented that can be executed by the control module 22 as an alternative implementation when multiple, short, low-capacity cycles have been operated when the humidity is high and a subsequent demand signal is received. For example, in either FIG. 11 or 12, if the last compressor operation involved bypassing the low-capacity mode and another subsequent demand signal is received while the indoor humidity continues to exceed a threshold amount, dehumidification may still be required and low-capacity mode may be bypassed again. This uses the most recent compressor operation to continue the dehumidification process while the indoor humidity remains above the threshold amount (e.g., 50%) to provide comfort and operation efficiency.

The method and control algorithm 1300 begins at 1302. At 1304 the control module 22 determines whether a demand signal has been received. The control module 22 loops back to 1304 until the demand signal is received. Once received, the control module 22 continues to 1306 and determines whether a short cycle flag is set. This short cycle flag is set when the previous compressor 12 operation bypassed the low-capacity mode and operated in high-capacity mode to dehumidify and/or to prevent energy losses. If the short cycle flag is set, the control module 22 determines whether the indoor humidity exceeds a threshold amount at 1308.

At 1308, when the indoor humidity exceeds the threshold amount, the control module 22 continues to 1310 and operates the compressor 12 in high-capacity mode to allow for dehumidification. At 1312 the control module 22 sets the short cycle flag because the most recent cycle bypassed the low-capacity mode and instead operated in the high-capacity mode. At 1308, when the indoor humidity does not exceed the threshold amount, the control module 22 continues with normal operation at 1314. After normal operation, at 1316 the control module 22 clears the short cycle flag as the most recent operation was normal operation, which may include operation in the low-capacity mode.

At 1306, when the control module 22 determines that the short cycle flag has not been set, as discussed above in FIGS. 11 and 12, the control module continues to 1318 to determine whether the number of low-capacity operating cycles over a predetermined period of time exceeds a predetermined threshold and whether the average length of the previous number of low-capacity runtimes is less than a predetermined value at 1320. When the control module determines at 1318 that the number of low-capacity operating cycles over the predetermined period exceeds the predetermined threshold and determines at 1320 that the average length of the previous number of low-capacity runtimes is less than the predetermined value, the control module continues to 1308 to determine whether the indoor humidity exceeds the threshold amount.

When the number of previous low-capacity demand signals over the predetermined period of time is less than the predetermined threshold at 1318, the control module 22 continues with normal operation at 1314 and clears the short cycle flag at 1316. When the average length of the previous low-capacity demand runtimes is over the predetermined value at 1320, the control module 22 continues with normal operation at 1314 and clears the short cycle flag at 1316. When the indoor humidity does not exceed the threshold amount at 1308, the control module 22 continues with normal operation 1314 and clears the short cycle flag at 1316.

With respect to FIGS. 11-13, when control leads the variable-capacity compressor to normal operation at 1108, 1208, and 1314, the compressor runtime is determined according to standard operation previously discussed and illustrated by FIGS. 3 and 4. In the present disclosure, the compressor runtime, when control bypasses low-capacity mode, may be a predetermined, rigid amount of time, for example, the high-capacity operation could be set to ten minutes. However, this high-capacity runtime may account of environmental variables. For example, the high-capacity runtime may change according to the outdoor-air-temperature, the outdoor-air-temperature slope, the previous cycle runtime, the indoor temperature, the indoor temperature slope, the indoor relative humidity, the indoor relative humidity slope, etc. Particularly, the length of the high-capacity runtime may vary using certain environmental variables to prevent the outdoor-air-temperature from quickly increasing, requiring another compressor operation, or to target dehumidification needs.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
a variable-capacity compressor operable in a first capacity mode and in a second capacity mode that is higher than the first capacity mode; and
a control module configured to switch the variable-capacity compressor between the first capacity mode and the second capacity mode based on a demand signal from a thermostat,
wherein the control module determines a number of previous consecutive operating cycles of the variable-capacity compressor in the first capacity mode within a predetermined period of time and operates the variable-capacity compressor in the second capacity mode in response to the number of previous consecutive operating cycles of the variable-capacity compressor in the first capacity mode within the predetermined period of time exceeding a predetermined threshold.

2. The system of claim 1, wherein the control module operates the variable-capacity compressor in the second capacity mode in response to an average runtime of the variable-capacity compressor in the first capacity mode during the predetermined period of time being less than a predetermined value.

3. The system of claim 1 wherein the thermostat includes an indoor relative humidity sensor that generates indoor relative humidity data corresponding to an indoor relative humidity.

4. The system of claim 3, wherein the control module operates the variable-capacity compressor in the second capacity mode in response to the indoor relative humidity exceeding a predetermined humidity.

5. The system of claim 3, wherein the control module determines a slope of the indoor relative humidity and operates the variable-capacity compressor in the second capacity mode based on the slope of the indoor relative humidity.

6. The system of claim 3, wherein the control module operates the variable-capacity compressor in the second capacity mode in response to a previous operating cycle being in the second capacity mode and the indoor relative humidity exceeding a predetermined humidity.

7. The system of claim 3, wherein the control module sets a runtime of the variable-capacity compressor in the second capacity mode according to the indoor relative humidity.

8. The system of claim 1, wherein the thermostat is further configured to measure an air temperature, receive a setpoint temperature, and generate the demand signal based on a difference between the air temperature and the setpoint temperature.

9. The system of claim 1, wherein the control module includes an outdoor-air-temperature sensor that generates outdoor-air-temperature data corresponding to an outdoor-air-temperature.

10. The system of claim 9, wherein the control module sets a runtime of the variable-capacity compressor in the second capacity mode according to the outdoor-air-temperature.

11. A method of controlling a variable-capacity compressor, comprising:
receiving, with a control module, a demand signal from a thermostat;
operating, with the control module, a variable-capacity compressor based on the demand signal, the variable-capacity compressor being operable in a first capacity mode and in a second capacity mode that is higher than the first capacity mode;
determining, with the control module, a number of previous consecutive operating cycles of the variable-capacity compressor in the first capacity mode within a predetermined period of time; and
operating, with the control module, the variable-capacity compressor in the second capacity mode in response to the number of previous consecutive operating cycles of the variable-capacity compressor in the first capacity mode within the predetermined period of time exceeding a predetermined threshold.

12. The method of claim 11, further comprising operating, with the control module, the variable-capacity compressor in the second capacity mode in response to an average runtime of the variable-capacity compressor in the first capacity mode during the predetermined period of time being less than a predetermined value.

13. The method of claim 11, wherein the thermostat includes an indoor relative humidity sensor that generates indoor relative humidity data corresponding to an indoor relative humidity.

14. The method of claim 13, further comprising operating, with the control module, the variable-capacity compressor in the second capacity mode in response to the indoor relative humidity exceeding a predetermined humidity.

15. The method of claim 13, further comprising operating, with the control module, the variable-capacity compressor in the second capacity mode based on a slope of the indoor relative humidity.

16. The method of claim 13, further comprising operating, with the control module, the variable-capacity compressor in the second capacity mode in response to a previous operating cycle being in the second capacity mode and the indoor relative humidity exceeding a predetermined humidity.

17. The method of claim 13, further comprising setting, with the control module, a runtime of the variable-capacity compressor in the second capacity mode according to the indoor relative humidity.

18. The method of claim 11, wherein the thermostat is configured to measure an air temperature, receive a setpoint temperature, and generate the demand signal based on a difference between the air temperature and the setpoint temperature.

19. The method of claim 11, wherein an outdoor-air-temperature sensor generates outdoor-air-temperature data corresponding to an outdoor-air-temperature.

20. The method of claim 19, setting, with the control module, a runtime of the variable-capacity compressor in the second capacity mode according to the outdoor-air-temperature.

* * * * *